US012726323B2

(12) United States Patent
Agiwal et al.

(10) Patent No.: US 12,726,323 B2
(45) Date of Patent: Sep. 1, 2026

(54) APPARATUS AND METHOD FOR RANDOM ACCESS USING SLICE SPECIFIC RACH CONFIGURATION

(71) Applicant: Samsung Electronics Co., Ltd., Suwon-si (KR)

(72) Inventors: Anil Agiwal, Suwon-si (KR); Hyunjeong Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 406 days.

(21) Appl. No.: 18/280,372

(22) PCT Filed: Mar. 3, 2022

(86) PCT No.: PCT/KR2022/003037
§ 371 (c)(1),
(2) Date: Sep. 5, 2023

(87) PCT Pub. No.: WO2022/186638
PCT Pub. Date: Sep. 9, 2022

(65) Prior Publication Data

US 2024/0080903 A1 Mar. 7, 2024

(30) Foreign Application Priority Data

Mar. 4, 2021 (KR) ........................ 10-2021-0029051

(51) Int. Cl.

| | |
|---|---|
| ***H04L 5/00*** | (2006.01) |
| ***H04W 74/0833*** | (2024.01) |
| ***H04W 74/0836*** | (2024.01) |
| ***H04W 74/0838*** | (2024.01) |

(52) U.S. Cl.
CPC ....... *H04L 5/0092* (2013.01); *H04W 74/0833* (2013.01); *H04W 74/0836* (2024.01); *H04W 74/0838* (2024.01)

(58) Field of Classification Search
CPC . H04W 74/0833; H04W 72/02; H04W 72/23; H04W 74/0838; H04W 74/08; H04L 5/0092
See application file for complete search history.

(56) References Cited

U.S. PATENT DOCUMENTS

| | | | |
|---|---|---|---|
| 11,638,204 | B2 | 4/2023 | Mildh et al. |
| 11,665,694 | B2 | 5/2023 | Agiwal et al. |
| 2019/0098672 | A1 | 3/2019 | Murray et al. |

(Continued)

FOREIGN PATENT DOCUMENTS

| | | | |
|---|---|---|---|
| KR | 10-2019-0049698 | A | 5/2019 |
| KR | 10-2205626 | B1 | 1/2021 |
| WO | 2018/066934 | A2 | 4/2018 |

OTHER PUBLICATIONS

Qualcomm Incorporated; Discussion on candidate solutions of slice-based RACH; 3GPP TSG RAN WG2 Meeting #113-e; R2-2100129; E-Conference; Jan. 25-Feb. 5, 2021; Jan. 15, 2021.

(Continued)

*Primary Examiner* — Iqbal Zaidi
(74) *Attorney, Agent, or Firm* — Jefferson IP Law, LLP

(57) ABSTRACT

The disclosure relates to a 5G or 6G communication system for supporting a higher data transmission rate. A system and a method of random access using slice specific random access channel (RACH) configuration are provided.

14 Claims, 3 Drawing Sheets

(56) References Cited

U.S. PATENT DOCUMENTS

| | | | | |
|---|---|---|---|---|
| 2019/0174561 | A1 | 6/2019 | Sivavakeesar | |
| 2020/0252847 | A1* | 8/2020 | Park | H04W 76/27 |
| 2023/0116626 | A1 | 4/2023 | Watfa et al. | |
| 2023/0199859 | A1* | 6/2023 | Li | H04W 74/0833 370/329 |
| 2023/0262781 | A1* | 8/2023 | Fang | H04W 74/0833 370/329 |

OTHER PUBLICATIONS

Samsung; Slice specific RACH configuration; 3GPP TSG-RAN WG2 Meeting #114-e; R2-2105345; Online; May 19-May 27, 2021; May 11, 2021.

Samsung; Slice specific RACH type selection; 3GPP TSG-RAN WG2 #115-e; R2-2107714 (Revision of R2-2105345); Online; Aug. 9-Aug. 27, 2021; Aug. 6, 2021.

3GPP; 3rd Generation Partnership Project; Technical Specification Group Radio Access Network; NR; Medium Access Control (MAC) protocol specification (Release 17); 3GPP TS 38.321; V17.0.0; (Mar. 2022); Apr. 14, 2022; Valbonne, France.

International Search Report with Written Opinion dated Jun. 13, 2022; International Appln. No. PCT/KR2022/003037.

* cited by examiner

[Fig. 1]
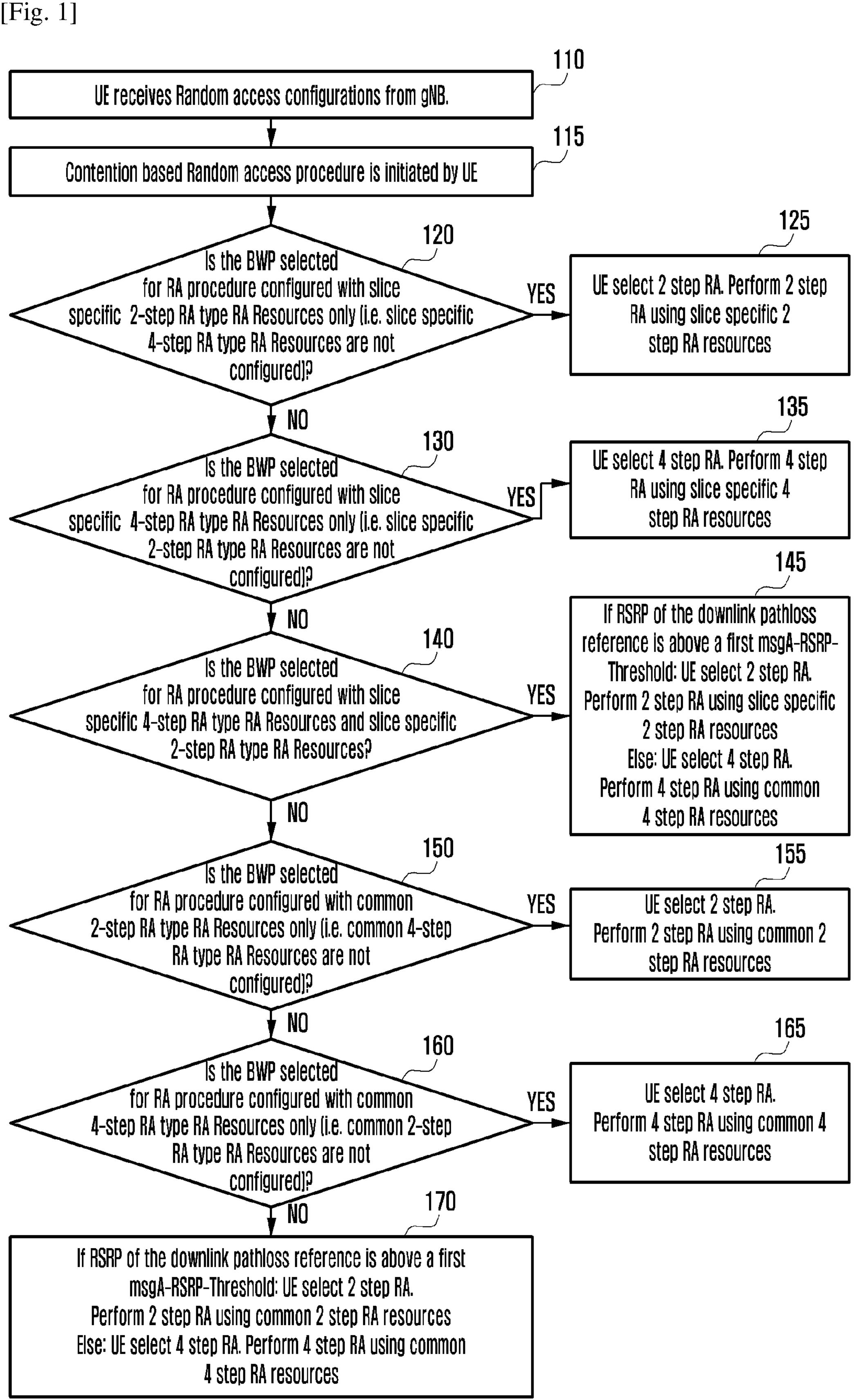

[Fig. 2]
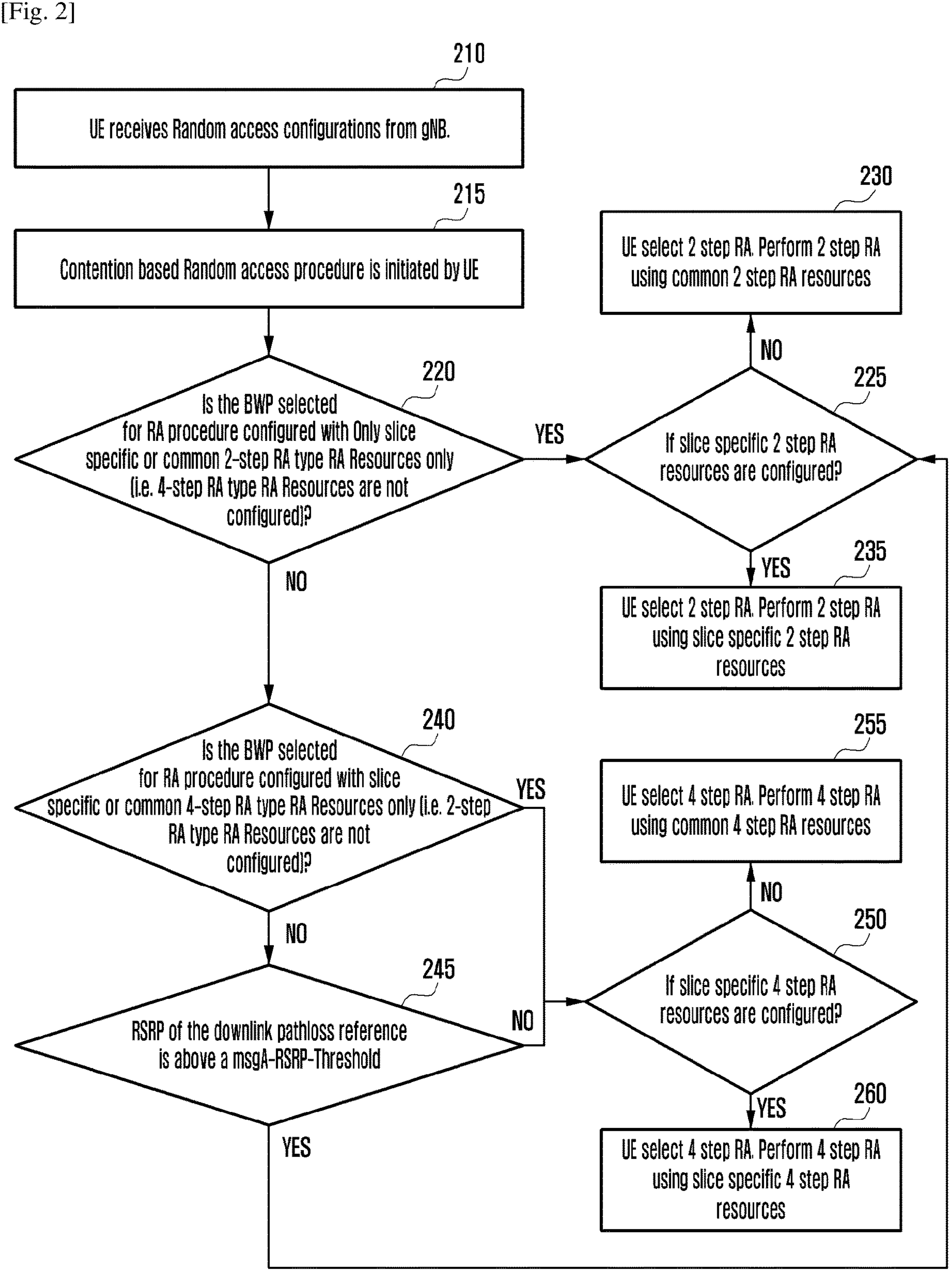

[Fig. 3]
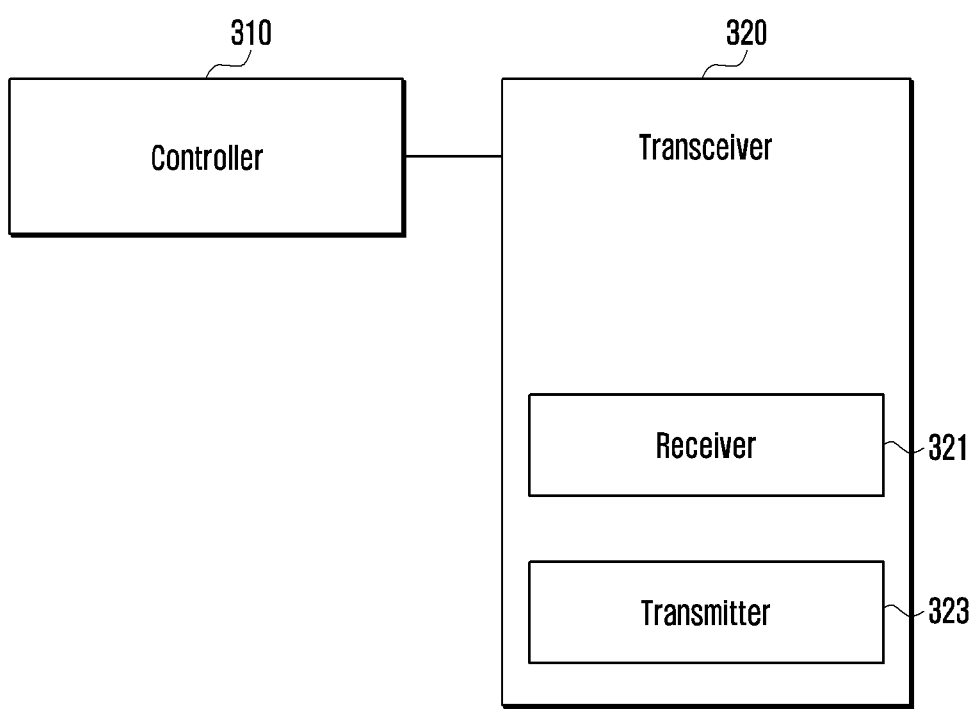
[Fig. 4]
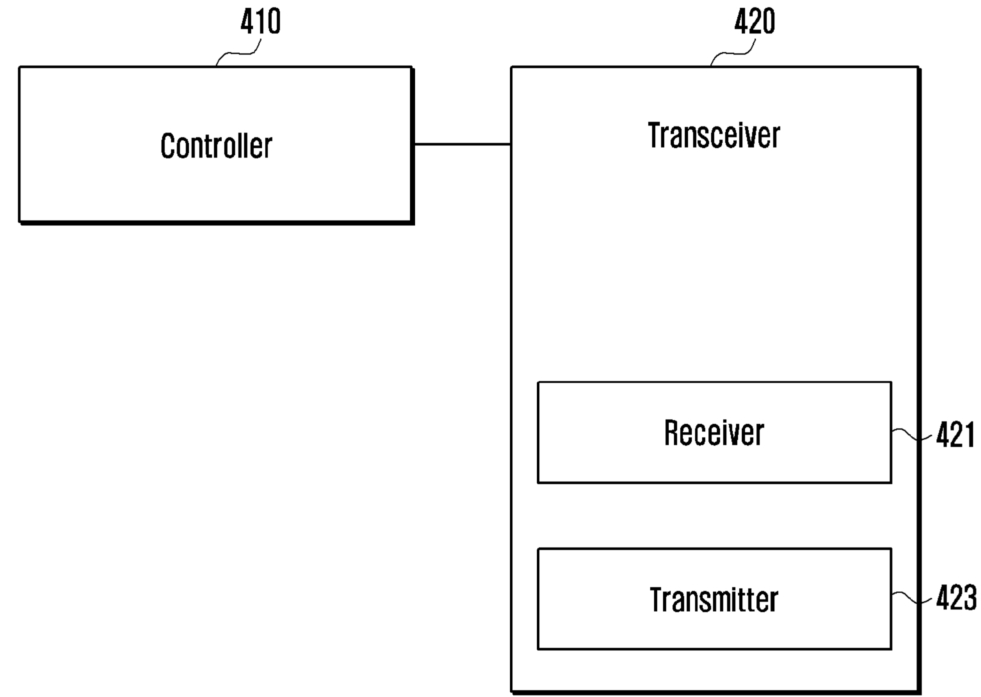

APPARATUS AND METHOD FOR RANDOM ACCESS USING SLICE SPECIFIC RACH CONFIGURATION

TECHNICAL FIELD

The disclosure relates to a system and a method of random access using slice specific random access channel (RACH) configuration.

BACKGROUND ART 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Technical Problem

The disclosure proposes how to select RA type considering slice specific RACH configuration.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In accordance with an aspect of the disclosure, a method performed by a terminal in a wireless communication system is provided. The method comprises: receiving, from a base station, configuration information on a random access; identifying whether slice specific random access resources are configured based on the configuration information; in case that slice specific random access resource are configured, selecting 2 step random access procedure or 4 step random access procedure based on the configured slice specific random access resource; and transmitting, to the base station, a message including a random access preamble using the slice specific random access resources.

In one embodiment, in case that the configured slice specific random access resources are slice specific 4 step random access type random access resources, the 4 step random access procedure is selected and the message is transmitted using the slice specific 4 step random access type random access resources.

In one embodiment, in case that the configured slice specific random access resources are slice specific 2 step random access type resources, the 2 step random access procedure is selected and the message is transmitted using the slice specific 2 step random access type random access resources.

In one embodiment, the method further comprises in case that the configured slice specific random access resources are slice specific 4 step random access type random access resources and slice specific 2 step random access type random access resources, identifying whether signal strength of downlink pathloss reference is above a preconfigured threshold.

In one embodiment, in case that the signal strength of downlink pathloss reference is above the preconfigured, the 2 step random access procedure is selected and the message is transmitted using the slice specific 2 step random access type random access resources, and in case that the signal strength of downlink pathloss reference is not above the preconfigured, the 4 step random access procedure is selected and the message is transmitted using the slice specific 2 step random access type random access resources In one embodiment, the method further comprises in case that slice specific random access resource are not configured, identifying whether common 2 step random access type random access resources are configured based on the configuration information; in case that the common 2 step random access type random access resources are configured, selecting 2 step random access procedure; and transmitting, to the base station, the message including a random access preamble using the common 2 step random access type random access resources.

In one embodiment, the method further comprises in case that slice specific random access resource are not configured, identifying whether common 4 step random access type random access resources are configured based on the configuration information; in case that the common 4 step random access type random access resources are configured, selecting 4 step random access procedure; and transmitting, to the base station, the message including a random access preamble using the common 4 step random access type random access resources.

In one embodiment, the method further comprises in case that slice specific random access resource are not configured, identifying that common 2 step random access type random access resources and common 4 step random access type random access resources are configured based on the configuration information; identifying whether signal strength of downlink pathloss reference is above a preconfigured threshold; in case that the signal strength of downlink pathloss reference is above the preconfigured, selecting the 2 step random access procedure and transmitting the message using the common 2 step random access type random access resources; and in case that the signal strength of downlink pathloss reference is not above the preconfigured, selecting the 4 step random access procedure and transmitting the message using the common 4 step random access type random access resources.

The disclosure also provides a terminal in a wireless communication system. The terminal comprises: a transceiver; and a controller coupled with the transceiver and configured to: receive, from a base station, configuration information on a random access, identify whether slice specific random access resources are configured based on the configuration information, in case that slice specific random access resource are configured, select 2 step random access procedure or 4 step random access procedure based on the configured slice specific random access resource, and transmit, to the base station, a message including a random access preamble using the slice specific random access resources.

Advantageous Effects of Invention

According to an embodiment of the disclosure, a method and an apparatus selecting RA type considering slice specific RACH configuration.

Advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF DRAWINGS

FIG. 1 is an example illustration of RA type selection according to this embodiment of the disclosure.

FIG. 2 is an example illustration of RA type selection according to this embodiment of the disclosure.

FIG. 3 is a diagram illustrating a configuration of a terminal according to the disclosure.

FIG. 4 is a diagram illustrating a configuration of a base station according to the disclosure.

MODE FOR THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may also refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

A "base station (BS)" is an entity communicating with a user equipment (UE) and may be referred to as a BS, a base transceiver station (BTS), a node B (NB), an evolved NB (eNB), an access point (AP), a fifth generation (5G) NB (5GNB), or a next generation NB (gNB).

A "UE" is an entity communicating with a BS and may be referred to as a UE, a device, a mobile station (MS), a mobile equipment (ME), or a terminal.

In the recent years several broadband wireless technologies have been developed to meet the growing number of broadband subscribers and to provide more and better applications and services. The second generation (2G) wireless communication system has been developed to provide voice services while ensuring the mobility of users. Third generation (3G) wireless communication system supports not only the voice service but also data service. The fourth generation (4G) wireless communication system has been developed to provide high-speed data service. However, currently, the fourth generation wireless communication system suffers from lack of resources to meet the growing demand for high speed data services. So fifth generation (5G) wireless communication system (also referred as next generation radio or NR) is being developed to meet the growing demand of various services with diverse requirements, e.g., high speed data services, support ultra-reliability and low latency applications, etc.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilise radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and PBCH (physical broadcast channel) block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB (master information block) and a number of SIBs (system information blocks) where:

- the MIB is always transmitted on the PBCH with a periodicity of 80 ms and repetitions made within 80 ms and it includes parameters that are needed to acquire SIB1 from the cell.
- the SIB1 is transmitted on the DL-SCH (downlink shared channel) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
- SIBs other than SIB1 are carried in SystemInformation (SI) messages, which are transmitted on the DL-SCH. Only SIBs having the same periodicity can be mapped to the same SI message.

In the fifth generation wireless communication system, physical downlink control channel (PDCCH) is used to schedule DL (downlink) transmissions on PDSCH and UL (uplink) transmissions on PUSCH (physical uplink shared channel), where the downlink control information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) (physical resource block(s)) and OFDM (orthogonal frequency-division multiplexing) symbol(s) where the UE may assume no transmission is intended for the UE; Transmission of TPC commands for PUCCH and PUSCH; Transmission of one or more TPC commands for SRS (Sounding reference signal) transmissions by one or more UEs; Switching a UE's active bandwidth part; Initiating a random access procedure. A UE monitors a set of PDCCH candidates in the configured monitoring occasions in one or more configured control resource sets (CORESETs) according to the corresponding search space configurations. A CORESET consists of a set of PRBs with a time duration of 1 to 3 OFDM symbols. The resource units resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by gNB for each configured bandwidth part (BWP) wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y^*(\text{number of slots in a radio frame})+x-\text{Monitoring-offset-PDCCH-slot})\bmod(\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the CORSET associated with the search space. search space configuration includes the identifier of CORSET configuration associated with it. A list of CORSET configurations are signaled by gNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS (subcarrier spacing) is pre-defined in NR. Each CORSET configuration is associated with a list of TCI (Transmission configuration indicator) states. One DL RS ID (SSB or CSI RS) is configured per TCI state. The list of TCI states corresponding to a CORSET configuration is signaled by gNB via RRC signaling. One of the TCI state in TCI state list is activated and indicated to UE by gNB. TCI state indicates the DL TX beam (DL TX beam is QCLed (quasi-co-located) with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a BWP. BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5G wireless communication system, random access (RA) is supported. random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits random access preamble (also referred as Msg1) and then waits for random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If CCCH (common control channel) SDU (service data unit) was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI (cell-RNTI) MAC CE, or padding. MsgA may include UE ID (e.g. random ID, S-TMSI (serving-temporary mobile subscriber identity), C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI (international mobile subscriber identity), idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP (reference-signal received power) above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the random access procedure is explicitly signalled by gNB, UE select the signalled carrier for performing random access procedure. If the carrier to use for the random access procedure is not explicitly signalled by gNB; and if the serving cell for the random access procedure is configured with supplementary uplink and if the RSRP of the downlink pathloss reference is less than rsrp-ThresholdSSB-SUL: UE select the SUL carrier for performing random access procedure. Otherwise, UE select the NUL carrier for performing random access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

In the 5G wireless communication system, network slicing is supported. A network slice is a logical network that provides specific network capabilities and network characteristics. Network slice instance is a set of network function instances and the required resources (e.g. compute, storage and networking resources) which form a deployed network slice. network slice is identified by the single network slice selection assistance information (S-NSSAI). The NSSAI (network slice selection assistance information) is a collection of S-NSSAIs. Currently 3GPP allows up to eight (8) S-NSSAIs in the NSSAI sent in signaling messages between the UE and the Network. This means a single UE may be served by at most eight network slices at a time. The S-NSSAI signaled by the UE to the network, assists the network in selecting a particular network slice instance.

An S-NSSAI is comprised of:

A slice/service type (SST), which refers to the expected network slice behaviour in terms of features and services;

A slice differentiator (SD), which is an optional information that complements the slice/service type(s) to differentiate amongst multiple network slices of the same slice/service type.

The S-NSSAI may be associated with a PLMN (public land mobile network) (e.g., PLMN ID) and have network-specific values or have standard values (e.g. SST for eMBB is 1, SST for URLLC is 2, SST for MIOT is 3). An S-NSSAI is used by the UE in access network in the PLMN that the S-NSSAI is associated with.

The access and mobility management function (AMF) instance that is serving the UE is common (or logically belongs) to all the network slice instances that are serving the UE. Other network functions, such as the session management function (SMF) or the user plan function (UPF), may be specific to each network slice.

The network slice instance selection for a UE is normally triggered as part of the registration procedure by the first AMF that receives the registration request from the UE. The AMF retrieves the slices that are allowed by the user subscription and interacts with the network slice selection function (NSSF) to select the appropriate network slice instance (e.g., based on Allowed S-NSSAIs, PLMN ID, etc.). This could result in a change of AMF if needed.

A protocol data unit (PDU) session is associated to one S-NSSAI and one DNN (data network name). The establishment of a PDU session within the selected instances—NSSAI is triggered when the AMF receives a session management message from UE. The AMF discovers candidate session management functions (SMF) using multiple parameters including the S-NSSAI provided in the UE request and selects the appropriate SMF. The selection of the user plane function (UPF) is performed by the SMF and uses the S-NSSAI. The network repository function (NRF) is used for the discovery of the required network functions using the selected network slice instance—the detailed procedures are specified in 3GPP TS 23.502. The data transmission can take place after a PDU session to a data network is established in a network slice. The S-NSSAI associated with a PDU session is provided to the AN, and to the policy and charging entities, to apply slice specific policies.

In the 5G wireless communication system, slice based RACH configuration is supported to facilitate RACH resource isolation and slice access prioritization. RACH configurations in a cell supports RAN slicing. The association between slices and slice-specific RACH resources can be configured and provided to UE in SIB and/or dedicated signalling. Separated PRACH configuration (e.g., transmission occasions of time-frequency domain and preambles) can be configured for slice or slice group. For example, there can be several configurations:

Common (non slice specific) RACH Config for 4 step RA
Common (non slice specific) RACH Config for 2 step RA
Slice Specific RACH config for 4 step RA
  4S (4 step) RA Slice Specific RACH config 1
  :
  4S RA Slice specific RACH config n
Slice Specific RACH config for 2 step RA
  2S (2 step) RA Slice Specific RACH config 1
  :
  2S RA Slice specific RACH config n The issue is how to select RA type considering slice specific RACH configuration.

RA Type Selection

Embodiment 1

FIG. 1 is an example illustration of RA type selection according to this embodiment of the disclosure.

At step 110, a UE (terminal) receives random access configurations from a base station (gNB). At step 115, the UE initiates the contention based random access procedure based on the received random access configurations.

At step 120, the UE identifies whether the BWP selected for RA procedure is configured with slice specific 2-step RA type RA resources only (i.e. whether slice specific 4-step RA type RA resources are not configured). In case that the BWP selected for RA procedure is configured with slice specific 2-step RA type RA resources only, at step 125, the UE selects 2 step RA, and performs 2 step RA using slice specific 2 step RA resources.

At step 130, the UE identifies whether the BWP selected for RA procedure is configured with slice specific 4-step RA type RA resources only (i.e. whether slice specific 2-step RA type RA resources are not configured). In case that the BWP selected for RA procedure is configured with slice specific 4-step RA type RA resources only, at step 135, the UE selects 4 step RA, and performs 4 step RA using slice specific 4 step RA resources.

At step 140, the UE identifies whether the BWP selected for RA procedure is configured with slice specific 4-step RA type RA resources and slice specific 2-step RA type RA type RA resources. In case that the BWP selected for RA procedure is configured with slice specific 4-step RA type RA resources and slice specific 2-step RA type RA type RA resources, at step 145, the UE determines whether RSRP of the downlink pathloss reference is above a first msgA-RSRP-Threshold. In case that the RSRP of the downlink pathloss reference is above a first msgA-RSRP-Threshold, the UE selects 2 step RA, and performs 2 step RA using slice specific 2 step RA resources. And, in case that the RSRP of the downlink pathloss reference is not above a first msgA-RSRP-Threshold, the UE selects 4 step RA, and performs 4 step RA using slice specific 4 step RA resources.

At step 150, the UE identifies whether the BWP selected for RA procedure is configured with common 2-step RA type RA resources only (i.e. whether common 4-step RA type RA resources are not configured). In case that the BWP selected for RA procedure is configured with common 2-step RA type RA resources only, at step 155, the UE selects 2 step RA, and performs 2 step RA using common 2 step RA resources.

At step 160, the UE identifies whether the BWP selected for RA procedure is configured with common 4-step RA type RA resources only (i.e. whether common 2-step RA type RA resources are not configured). In case that the BWP selected for RA procedure is configured with common 4-step RA type RA resources only, at step 165, the UE selects 4 step RA, and performs 4 step RA using common 4 step RA resources.

In case that the BWP selected for RA procedure is not only configured with common 4-step RA type RA resources, i.e. the BWP selected for RA procedure is configured with common 4-step RA type RA resources and common 2-step RA type RA type RA resources, at step 170, the UE identifies whether RSRP of the downlink pathloss reference is above a first msgA-RSRP-Threshold. In case that the RSRP of the downlink pathloss reference is above a first msgA-RSRP-Threshold, the UE selects 2 step RA, and performs 2 step RA using common 2 step RA resources. And, in case that the RSRP of the downlink pathloss reference is not above a first msgA-RSRP-Threshold, the UE selects 4 step RA, and performs 4 step RA using common 4 step RA resources.

The steps do not necessarily have to be performed in the order described above. For example, step 130 does not have to be performed after step 120, but step 130 may be performed before step 120. This can be equally applied to step 120 to step 170.

More specifically, 1. AS (access stratum) in UE receives information about one or more intended slice from NAS (non-access stratum).

2. RRC initiates RRC connection or RRC connection resume or any other procedure to access network.
3. MAC initiates random access procedure.
4. During the random access procedure initialisation, UE first selects the carrier (SUL or NUL). If the carrier to use for the random access procedure is explicitly signalled by gNB, UE selects the signaled carrier for performing random access procedure. If the carrier to use for the random access procedure is not explicitly signaled; and if the serving cell for the random access procedure is configured with supplementary uplink and if the RSRP of the downlink pathloss reference is less than rsrp-ThresholdSSB-SUL (signaled by gNB): UE select the SUL carrier for performing random access procedure. Otherwise, UE select the NUL carrier for performing random access procedure.

Upon selecting the UL carrier, UE determines the UL and DL BWP for random access procedure.

UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

Option 1:

If 4 step random access resources are configured for slice in which UE is interested, Perform 4 step RA using slice specific 4 step RA resource.

Else,

Perform 4 step RA using common 4 step RA resource.

Option 2:

Perform 4 step RA using common 4 step RA resource.

Option 3: Slice information or RACH resource configuration to use is indicated in PDCCH order.

Perform 4 step RA using resources corresponding to indicated slice or RACH resource configuration.

else if 2 step contention free random access resources are signaled by gNB for this random access procedure, UE selects 2 step RACH and performs 2 step RA using 2 step RA resources signaled by gNB in dedicated RRC signaling.

else if 4 step contention free random access resources are signaled by gNB for this random access procedure, UE selects 4 step RACH and performs 4 step RA using 4 step RA resources signaled by gNB in dedicated RRC signaling.

else if the BWP selected for random access procedure is configured with slice specific 2-step RA type random access resources and if slice specific 4-step RA type random access resources are not configured (step 120):

UE select 2 step RA and performs 2 step RA using slice specific 2 step RA resources (or 2 step RA resource configuration) (step 125).

Note that 'slice specific' means corresponding to UE's intended slice (or allowed slice or requested slice or slice received from NAS or slice in which UE is interested). In an embodiment, it may mean corresponding to any slice or corresponding to UE's slice group.

Else if the BWP selected for random access procedure is not configured with slice specific 2-step RA type random access resources and if slice specific 4-step RA type random access resources are configured (step 130):

UE select 4 step RA and performs 4 step RA using slice specific 4 step RA resources (or 4 step RA resource configuration) (step 135).

Note that 'slice specific' means corresponding to UE's intended slice. In an embodiment, it may mean corresponding to any slice or corresponding to UE's slice group.

Else if the BWP selected for random access procedure is configured with slice specific 2-step RA type random access resources and if slice specific 4-step RA type random access resources are configured (step 140):

If RSRP of the downlink pathloss reference is above a first msgA-RSRP-Threshold, UE select 2 step RA and performs 2 step RA using slice specific 2 step RA resources (or 2 step RA resource configuration).

Else,

UE select 4 step RA and perform 4 step RA using slice specific 4 step RA resources (or 4 step RA resource configuration) (step 145).

Note that 'slice specific' means corresponding to UE's intended slice (or allowed slice or requested slice or slice received from NAS or slice in which UE is interested). In an embodiment, it may mean corresponding to any slice or corresponding to UE's slice group. Slice(s) associated with RACH configuration is signaled by gNB. GNB can signal multiple RACH configurations.

else if the UL BWP selected for this random access procedure is configured with only 2 step common RACH resources (i.e. not slice specific RACH resources) (step 150):

UE selects 2 step RACH and performs 2 step RA using common 2 step RA resources (or 2 step RA resource configuration) (step 155).

else if the UL BWP selected for this random access procedure is configured with only 4 step common RACH resources (i.e. not slice specific RACH resources) (step 160):

UE selects 4 step RACH and perform 4 step RA using common 4 step RA resources (or 4 step RA resource configuration) (step 165).

else if the UL BWP selected for this random access procedure is configured with both 2 step and 4 step common RACH resources (i.e. not slice specific RACH resources) (step 170):

if RSRP of the downlink pathloss reference is below a second msgA-RSRP-Threshold, UE selects 4 step RACH, and performs 4 step RA using common 4 step RA resources (or 4 step RA resource configuration). Otherwise UE selects 2 step RACH, and performs 2 step RA using common 2 step RA resources (or 2 step RA resource configuration) (step 170).

In the above description, second msgA-RSRP-Threshold and first msgA-RSRP-Threshold can be same or separately configured by gNB using SI or RRC signalling message.

UL carrier for random access procedure is explicitly signaled by gNB during handover or reconfiguration with sync for 4 step RACH. If gNB wants UE to select NUL for 4 step RACH, it provides 4 step contention free random access resources for NUL in reconfiguration message. If gNB wants UE to select SUL for 4 step RACH, it provides 4 step contention free random access resources for SUL in reconfiguration message. In an embodiment, UL carrier for 2 step random access procedure is also explicitly signaled by gNB during handover or reconfiguration with sync. If gNB want UE to select NUL for 2 step RACH, it provides 2 step contention free random access resources for NUL in reconfiguration message. If gNB wants UE to select SUL for 2 step RACH, it provides 2 step contention free random access resources for SUL in reconfiguration message.

If 2 step contention free random access resources for SUL is signaled by gNB during handover or reconfiguration with sync, UE selects SUL and RACH type selected is 2 step RACH. If 2 step contention free random access resources for NUL is signaled by gNB during handover or reconfiguration with sync, UE selects NUL and RACH type selected is 2 step RACH. If 4 step contention free random access resources for SUL is signaled by gNB during handover or reconfiguration with sync, UE selects SUL and RACH type selected is 4 step RACH. If 4 step contention free random access resources for NUL is signaled by gNB during handover or reconfiguration with sync, UE selects NUL and RACH type selected is 4 step RACH.

Embodiment 2

FIG. 2 is an example illustration of RA type selection according to this embodiment of the disclosure.

At step 210, a UE receives random access configurations from a base station (gNB). At step 215, the UE initiates the contention based random access procedure based on the received random access configurations.

At step 220, the UE identifies whether the BWP selected for RA procedure is configured with slice specific or common 2-step RA type RA resources only (i.e. whether 4-step RA type RA resources are not configured). In case that the BWP selected for RA procedure is configured with slice specific or common 2-step RA type RA resources only, at step 225, the UE identifies whether slice specific 2 step RA resources are configured. In case that the slice specific 2 step RA resources are configured, at step 235, the UE selects 2 step RA, and performs 2 step RA using slice specific 2 step RA resources. In case that the slice specific 2 step RA resources are not configured (i.e. the common 2 step RA resources are configured), at step 230, the UE selects 2 step RA, and performs 2 step RA using common 2 step RA resources.

At step 240, the UE identifies whether the BWP selected for RA procedure is configured with slice specific or common 4-step RA type RA resources only (i.e. whether 2-step RA type RA resources are not configured). In case that the BWP selected for RA procedure is configured with slice specific or common 4-step RA type RA resources only, at step 250, the UE identifies whether slice specific 4 step RA resources are configured. In case that the slice specific 4 step RA resources are configured, at step 260, the UE selects 4 step RA, and performs 4 step RA using slice specific 4 step RA resources. In case that the slice specific 4 step RA resources are not configured (i.e. the common 4 step RA resources are configured), at step 255, the UE selects 4 step RA, and performs 4 step RA using common 4 step RA resources.

The UE identifies that the BWP selected for RA procedure is not only configured with slice specific or common 2-step RA type RA resources and the BWP selected for RA procedure is not only configured with slice specific or common 4-step RA type RA resources, i.e. the BWP selected for RA procedure is configured with slice specific or common 2-step RA type RA resources and with slice specific or common 4-step RA type RA resources. At step 245, the UE determines whether RSRP of the downlink pathloss reference is above a first msgA-RSRP-Threshold. In case that the RSRP of the downlink pathloss reference is above a first msgA-RSRP-Threshold, at step 225, the UE identifies whether slice specific 2 step RA resources are configured. In case that the slice specific 2 step RA resources are configured, at step 235, the UE selects 2 step RA, and performs 2 step RA using slice specific 2 step RA resources. In case that the slice specific 2 step RA resources are not configured (i.e. the common 2 step RA resources are configured), at step 230, the UE selects 2 step RA, and performs 2 step RA using common 2 step RA resources. In case that the RSRP of the downlink pathloss reference is not above a first msgA-RSRP-Threshold, at step 250, the UE identifies whether slice specific 4 step RA resources are configured. In case that the slice specific 4 step RA resources are configured, at step 260, the UE selects 4 step RA, and performs 4 step RA using slice specific 4 step RA resources. In case that the slice specific 4 step RA resources are not configured (i.e. the common 4 step RA resources are configured), at step 255, the UE selects 4 step RA, and performs 4 step RA using common 4 step RA resources.

The steps do not necessarily have to be performed in the order described above. For example, step 240 does not have to be performed after step 220, but step 240 may be performed before step 220. This can be equally applied to step 220 to 260.

More specifically, 1. AS in UE receives information about one or more intended slice from NAS.

2. RRC initiates RRC connection or RRC connection resume or any other procedure to access network.
3. MAC initiates random access procedure
4. During the random access procedure initialisation, UE first selects the carrier (SUL or NUL). If the carrier to use for the random access procedure is explicitly signaled by gNB, UE selects the signaled carrier for performing random access procedure. If the carrier to use for the random access procedure is not explicitly signaled; and if the serving cell for the random access procedure is configured with supplementary uplink and if the RSRP of the downlink pathloss reference is less than rsrp-ThresholdSSB-SUL (signaled by gNB): UE select the SUL carrier for performing random access procedure. Otherwise, UE select the NUL carrier for performing random access procedure.

Upon selecting the UL carrier, UE determines the UL and DL BWP for random access procedure.

UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

Option 1:

If 4 step RA resources are configured for slice in which UE is interested.

Perform 4 step RA using slice specific 4 step RA resources.

Else

Perform 4 step RA using common 4 step RA resources.

Option 2:

Perform 4 step RA using common 4 step RA resources.

Option 3: Slice info or RACH resource configuration to use is indicated in PDCCH order.

Perform 4 step RA using resources corresponding to indicated slice or RACH resource configuration.

else if 2 step contention free random access resources are signaled by gNB for this random access procedure, UE selects 2 step RACH and performs 2 step RA using 2 step RA resources signaled by gNB in dedicated RRC signaling.

else if 4 step contention free random access resources are signaled by gNB for this random access procedure, UE selects 4 step RACH and performs 4 step RA using 4 step RA resources signaled by gNB in dedicated RRC signaling.

else if the BWP selected for random access procedure is configured with only common or slice specific 2-step RA type random access resources (i.e. 4 step RA resources are not configured) (step 220):

UE select 2 step RA.

If slice specific 2 step RA resources are configured (step 225),

Perform 2 step RA using slice specific 2 step RA resources (or 2 step RA resource configuration) (step 235).

Else (step 225),

Perform 2 step RA using common 2 step RA resources (or 2 step RA resource configuration) (step 230).

Note that 'slice specific' means corresponding to UE's intended slice (or allowed slice or requested slice or slice received from NAS or slice in which UE is interested). In an embodiment, it may mean corresponding to any slice or corresponding to UE's slice group.

Else if the BWP selected for random access procedure is configured with only slice specific or common 4-step RA type random access resources (i.e. both common and slice specific 2 step RA resources are not configured) (step 240):

UE select 4 step RA.

If slice specific 4 step RA resources are configured (step 250),

Perform 4 step RA using slice specific 4 step RA resources (or 4 step RA resource configuration) (step 260), Else (step 250), Perform 4 step RA using common 4 step RA resources (or 4 step RA resource configuration) (step 255).

Note that 'slice specific' means corresponding to UE's intended slice. In an embodiment, it may mean corresponding to any slice or corresponding to UE's slice group.

Else if the BWP selected for random access procedure is configured with slice specific or common 2-step RA type random access resources and if the BWP selected for random access procedure is configured with slice specific or common 4-step RA type random access resources:

If RSRP of the downlink pathloss reference is above a msgA-RSRP-Threshold (step 245), UE select 2 step RA.

If slice specific 2 step RA resources are configured (step 225),

Perform 2 step RA using slice specific 2 step RA resources (or 2 step RA resource configuration) (step 235)

Else (step 225),

Perform 2 step RA using common 2 step RA resources (or 2 step RA resource configuration) (step 230)

Else (step 245),

UE select 4 step RA.

If slice specific 4 step RA resources are configured (step 250),

Perform 4 step RA using slice specific 4 step RA resources (or 4 step RA resource configuration) (step 260).

Else (step 250),

Perform 4 step RA using common 4 step RA resources (or 4 step RA resource configuration) (step 255).

Note that 'slice specific' means corresponding to UE's intended slice (or allowed slice or requested slice or slice received from NAS or slice in which UE is interested). In an embodiment, it may mean corresponding to any slice or corresponding to UE's slice group. Slice(s) associated with RACH configuration is signaled by gNB. The gNB can signal multiple RACH configurations.

In the above description, msgA-RSRP-Threshold is configured by gNB using SI or RRC signalling message.

UL carrier for random access procedure is explicitly signaled by gNB during handover or reconfiguration with sync for 4 step RACH. If gNB wants UE to select NUL for 4 step RACH, it provides 4 step contention free random access resources for NUL in reconfiguration message. If gNB wants UE to select SUL for 4 step RACH, it provides 4 step contention free random access resources for SUL in reconfiguration message. In an embodiment, UL carrier for 2 step random access procedure is also explicitly signaled by gNB during handover or reconfiguration with sync. If gNB want UE to select NUL for 2 step RACH, it provides 2 step contention free random access resources for NUL in reconfiguration message. If gNB wants UE to select SUL for 2 step RACH, it provides 2 step contention free random access resources for SUL in reconfiguration message.

If 2 step contention free random access resources for SUL is signaled by gNB during handover or reconfiguration with sync, UE selects SUL and RACH type selected is 2 step RACH. If 2 step contention free random access resources for NUL is signaled by gNB during handover or reconfiguration with sync, UE selects NUL and RACH type selected is 2 step RACH. If 4 step contention free random access resources for SUL is signaled by gNB during handover or reconfiguration with sync, UE selects SUL and RACH type selected is 4 step RACH. If 4 step contention free random access resources for NUL is signaled by gNB during handover or reconfiguration with sync, UE selects NUL and RACH type selected is 4 step RACH.

2 Step RA to 4 Step RA Fallback Operation

Embodiment 1

Random access procedure is initiated and UE has selected 2 step RA procedure.

UE initializes the preamble transmission counter (PREAMBLE_TRANSMISSION_COUNTER) to zero.

If the random access procedure was initiated for handover; and if rach-ConfigDedicated is configured for the selected carrier:

if msgA-TransMax is configured in the rach-ConfigDedicated: apply msgA-TransMax configured in the rach-ConfigDedicated.

else if slice specific RACH configuration is used for this RA procedure and msgA-TransMax is included in the slice specific RACH configuration:

apply msgA-TransMax included in the slice specific RACH configuration.

else if common (i.e. non slice specific) RACH configuration) is used for this RA procedure and msgA-TransMax is included in the common (i.e. non slice specific) RACH configuration:

apply msgA-TransMax included in the common (i.e. non slice specific) RACH configuration.

Step 1: If contention free random access resources are provided by gNB and there is at least one SSB/CSI RS having SS-RSRP/CSI-RSRP above a threshold amongst the SSBs/CSI RSs for which contention free random access resources are provided, UE transmit random access preamble in PRACH occasion and MAC PDU in PUSCH occasion using the assigned contention free random access resources. Otherwise, UE transmit random access preamble in PRACH occasion and MAC PDU in PUSCH occasion using the contention based random access resources. In an embodiment, it is possible that a valid PUSCH occasion is not available corresponding to selected SSB/CSI-RS and in this case UE skips transmission of MsgA MAC PDU.

Step 2: UE then starts msgB-ResponseWindow and monitor the PDCCH for random access response in msgB-ResponseWindow. UE monitors the PDCCH of the SpCell for a random access response identified by MSGB-RNTI while the msgB-ResponseWindow is running. If C-RNTI MAC CE was included in the MSGA: UE additionally monitor the PDCCH of the SpCell for random access response identified by the C-RNTI while the msgB-ResponseWindow is running.

Step 3: While msgB-ResponseWindow is running:

If C-RNTI was included in MsgA and UE receives PDCCH addressed to C-RNTI and this random access procedure was initiated for BFR (beam failure recovery): RAR reception is successful. RA procedure is successfully completed. Go to step 8.

Else if C-RNTI was included in MsgA and TAT (time alignment timer) timer associated with PTAG (primary timing advance group) is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that UE will not use these resources for subsequent random access procedure. Go to step 8. In an embodiment, release operation may not be performed in this case, as contention free resources may not be configured for the case where PTAG is running and RA is initiated for events other than BFR.

Else if C-RNTI was included in MsgA and TAT timer associated with PTAG is not running and UE receives PDCCH addressed to C-RNTI and DL TB (transport block) scheduled by this PDCCH includes absolute timing advanced command MAC CE: RAR reception is successful. RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else if UE receives PDCCH addressed to MSGB-RNTI and decoded TB includes fallbackRAR MAC subPDU corresponding to its transmitted preamble: RAR reception is successful.

If random access preamble transmitted is contention free random access preamble: RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else,

Transmit MsgA MAC PDU as Msg3 in UL grant received in fallbackRAR

Start contention resolution timer

Go to step 5

Else if UE receives PDCCH addressed to MSGB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8. Note that this is the case when CCCH SDU is included in MSGA, that is UE is in idle/inactive or performing RRC connection re-establishment. For these cases contention free resources are not configured, so no need to release. In an alternate embodiment, UE releases the 2 step CFRA resources (random access preamble(s), RACH occasions, PUSCH resources) configured (if any) for this random access procedure. Release here means that UE will not use these resources for subsequent random access procedure.

Step 4: If RAR window expires:

Increment preamble transmission counter by 1.

If msgATransMax is configured/applied, and if PREAMBLE_TRANSMISSION_COUNTER=msgATransMax+1:

If random access configuration used for this random access procedure is slice specific:

If 4 step random access configuration specific to slice is available

UE switches to 4 step RA. Go to step 7

UE uses 4 step random access configuration specific to slice for 4 step RA.

Else

UE does not fallback to 4 step RA i.e. it continues 2 step RA. Go to step 1.

Else if random access configuration used for this random access procedure is not slice specific:

UE switches to 4 step RA.

(Alt 1) If 4 step random access configuration specific to slice is available,

UE uses that configuration for 4 step RA.

Else,

UE uses the common configuration for 4 step RA

Go to step 7

(Alt 2) If 4 step non-slice specific random access configuration is available, UE switches to 4 step RA, UE uses the non-slice specific common configuration for 4 step RA and go to step 7. If 4 step non-slice specific random access configuration is not available, UE does not fallback to 4 step RA i.e. it continues 2 step RA. Go to step 1.

Note that 'slice specific' means corresponding to UE's intended slice (or allowed slice or requested slice or slice received from NAS or slice in which UE is interested). In an embodiment, it may mean corresponding to any slice or corresponding to UE's slice group. Slice(s) associated with RACH configuration is signaled by gNB. GNB can signal multiple RACH configurations.

Else:

go to step 1

Step 5: While contention resolution timer is running:

If the random access procedure was initiated for beam failure recovery and the UE receives PDCCH transmission addressed to the C-RNTI; or if the random access procedure was initiated by a PDCCH order and the UE receives PDCCH transmission addressed to the C-RNTI; or if the random access procedure was initiated by the MAC sublayer itself or by the RRC sublayer and the UE receives PDCCH transmission addressed to the C-RNTI and contains a UL grant for a new transmission: Contention resolution is successful; RA procedure is successfully completed. Release 2 step CFRA resources i.e. preambles/ROs/PUSCH resources configured (if any) for this RA procedure. Go to step 8. Release here means that UE will not use these resources for subsequent random access procedure.

Step 6: If contention resolution timer expires:

Increment preamble transmission counter by 1.

If msgATransMax is configured/applied, and if PREAMBLE_TRANSMISSION_COUNTER=msgATransMax+1:

If random access configuration used for this random access procedure is slice specific:

If 4 step random access configuration specific to slice is available

UE switches to 4 step RA. Go to step 7

UE uses 4 step random access configuration specific to slice for 4 step RA.

Else

UE does not fallback to 4 step RA i.e. it continues 2 step RA. Go to step 1.

Else If random access configuration used for this random access procedure is not slice specific <Alt 1> UE switches to 4 step RA.

If 4 step random access configuration specific to slice is available

UE uses that configuration for 4 step RA.

Else

UE uses the common configuration for 4 step RA

Go to step 7

(Alt 2) If 4 step non-slice specific random access configuration is available, UE switches to 4 step RA, UE uses the non-slice specific common configuration for 4 step RA and go to step 7. If 4 step non-slice specific random access configuration is not available, UE does not fallback to 4 step RA i.e. it continues 2 step RA. Go to step 1.

Else:

go to step 1

Step 7: perform 4 step RA. If 4 step CFRA resources are configured, these will be released when RA procedure is completed.

If 4 step random access configuration specific to slice is available

UE uses that configuration for 4 step RA.

Else

UE uses the common configuration for 4 step RA

Step 8: Stop.

Embodiment 2

Random access procedure is initiated and UE has selected 2 step RA procedure.

UE initializes the preamble transmission counter (PREAMBLE_TRANSMISSION_COUNTER) to zero.

If the random access procedure was initiated for handover; and if rach-ConfigDedicated is configured for the selected carrier:

if msgA-TransMax is configured in the rach-ConfigDedicated: apply msgA-TransMax configured in the rach-ConfigDedicated.

else if slice specific RACH configuration is used for this RA procedure and msgA-TransMax is included in the slice specific RACH configuration:

apply msgA-TransMax included in the slice specific RACH configuration.

else if common (i.e. non slice specific) RACH configuration) is used for this RA procedure and msgA-TransMax is included in the common (i.e. non slice specific) RACH configuration:

apply msgA-TransMax included in the common (i.e. non slice specific) RACH configuration.

Step 1: If contention free random access resources are provided by gNB and there is at least one SSB/CSI RS having SS-RSRP/CSI-RSRP above a threshold amongst the SSBs/CSI RSs for which contention free random access resources are provided, UE transmit random access preamble in PRACH occasion and MAC PDU in PUSCH occasion using the assigned contention free random access resources. Otherwise, UE transmit random access preamble in PRACH occasion and MAC PDU in PUSCH occasion using the contention based random access resources. In an embodiment, it is possible that a valid PUSCH occasion is not available corresponding to selected SSB/CSI-RS and in this case UE skips transmission of MsgA MAC PDU.

Step 2: UE then starts msgB-ResponseWindow and monitor the PDCCH for random access response in msgB-ResponseWindow. UE monitors the PDCCH of the SpCell for a random access response identified by MSGB-RNTI while the msgB-ResponseWindow is running. If C-RNTI MAC CE was included in the MSGA: UE additionally monitor the PDCCH of the SpCell for random access response identified by the C-RNTI while the msgB-ResponseWindow is running.

Step 3: While msgB-ResponseWindow is running:

If C-RNTI was included in MsgA and UE receives PDCCH addressed to C-RNTI and this random access procedure was initiated for BFR: RAR reception is successful. RA procedure is successfully completed. Go to step 8.

Else if C-RNTI was included in MsgA and TAT timer associated with PTAG is running and UE receives PDCCH addressed to C-RNTI and this PDCCH contains UL grant for new transmission: RAR reception is successful. RA procedure is successfully completed. UE releases the 2 step CFRA resources (random access preamble(s), RACH occasions, PUSCH resources) configured (if any) for this random access procedure. Release here means that UE will not use these resources for subsequent random access procedure. Go to step 8. In an embodiment, release operation may not be performed in this case, as contention free resources may not be configured for the case where PTAG is running and RA is initiated for events other than BFR.

Else if C-RNTI was included in MsgA and TAT timer associated with PTAG is not running and UE receives PDCCH addressed to C-RNTI and DL TB scheduled by this PDCCH includes Absolute timing advanced command MAC CE: RAR reception is successful. RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else if UE receives PDCCH addressed to MSGB-RNTI and decoded TB includes fallbackRAR MAC subPDU corresponding to its transmitted preamble: RAR reception is successful.

If random access preamble transmitted is contention free random access preamble: RA procedure is successfully completed. UE releases the 2 step CFRA resources (random access preamble(s), RACH occasions, PUSCH resources) configured (if any) for this random access procedure. Go to step 8. Release here means that UE will not use these resources for subsequent random access procedure.

Else,

Transmit MsgA MAC PDU as Msg3 in UL grant received in fallbackRAR.

Start contention resolution timer.

Go to step 5.

Else if UE receives PDCCH addressed to MSGB-RNTI and decoded TB includes successRAR MAC subPDU corresponding to UE's contention resolution identity (i.e. contention resolution identity received matches the first 48 bits of CCCH SDU transmitted in MsgA): RAR reception is successful. RA procedure is successfully completed. Go to step 8. Note that this is the case when CCCH SDU is included in MSGA, that is UE is in idle/inactive or performing RRC connection re-establishment. For these cases contention free resources are not configured, so no need to release. In an alternate embodiment, UE releases the 2 step CFRA resources (random access preamble(s), RACH occasions, PUSCH resources) configured (if any) for this random access procedure. Release here means that UE will not use these resources for subsequent random access procedure.

Step 4: If RAR window expires:

Increment preamble transmission counter by 1.

If msgATransMax is configured/applied, and if PREAMBLE_TRANSMISSION_COUNTER=msgATransMax+1:

UE switches to 4 step RA.

If 4 step random access configuration specific to slice is available,

UE uses that configuration for 4 step RA.

Else,

UE uses the common configuration for 4 step RA.

Go to step 7.

Note that 'slice specific' means corresponding to UE's intended slice (or allowed slice or requested slice or slice received from NAS or slice in which UE is interested). In an embodiment, it may mean corresponding to any slice or corresponding to UE's slice group. Slice(s) associated with RACH configuration is signaled by gNB. GNB can signal multiple RACH configurations.

Else:

go to step 1

Step 5: While contention resolution timer is running:

If the random access procedure was initiated for beam failure recovery and the UE receives PDCCH transmission addressed to the C-RNTI; or if the random access procedure was initiated by a PDCCH order and the UE receives PDCCH transmission addressed to the C-RNTI; or if the random access procedure was initiated by the MAC sublayer itself or by the RRC sublayer and the UE receives PDCCH transmission addressed to the C-RNTI and contains a UL grant for a new transmission: Contention resolution is successful; RA procedure is successfully completed. Release 2 step CFRA resources i.e. preambles/ROs/PUSCH resources configured (if any) for this RA procedure. Go to step 8. Release here means that UE will not use these resources for subsequent random access procedure.

Step 6: If contention resolution timer expires:

Increment preamble transmission counter by 1.

If msgATransMax is configured/applied, and if PREAMBLE_TRANSMISSION_COUNTER=msgATransMax+1:

UE switches to 4 step RA.

If 4 step random access configuration specific to slice is available,

UE uses that configuration for 4 step RA.

Else,

UE uses the common configuration for 4 step RA.

Go to step 7.

Else:

go to step 1.

Step 7: perform 4 step RA. If 4 step CFRA resources are configured, these will be released when RA procedure is completed.

If 4 step random access configuration specific to slice is available,

UE uses that configuration for 4 step RA.

Else,

UE uses the common configuration for 4 step RA.

Step 8: Stop.

FIG. 3 is a diagram illustrating a configuration of a terminal according to the disclosure.

The terminal (UE) according to an embodiment of the disclosure may include a transceiver 320 and a controller 310 that controls the overall operation of the terminal. The transceiver 320 may include a transmitter 321 and a receiver 323.

The transceiver 320 may transmit and receive signals to and from other network entities.

The controller 310 may control the terminal to perform one operation in the above-described embodiments. Meanwhile, the controller 310 and the transceiver 320 do not have to be implemented as separated modules but may be implemented as one element such as a single chip. The controller 310 and the transceiver 320 may be electrically connected. For example, the controller 310 may be a circuit, an application-specific circuit, or at least one processor. Further, the operations of the terminal may be performed by including a memory device storing a corresponding program code in a predetermined element within the terminal.

FIG. 4 is a diagram illustrating a configuration of a base station according to the disclosure.

The base station according to an embodiment of the disclosure may include a transceiver 420 and a controller 410 that controls the overall operation of the base station. The transceiver 420 may include a transmitter 421 and a receiver 423.

The transceiver 420 may transmit and receive signals to and from network entities and the terminal.

The controller 410 may control the base station to perform one operation in the above-described embodiments. Meanwhile, the controller 410 and the transceiver 420 do not have be implemented as separated modules but may be implemented as one element such as a single chip. The controller 410 and the transceiver 420 may be electrically connected. For example, the controller 410 may be a circuit, an application-specific circuit, or at least one processor. Further, the operations of the base station may be performed by including a memory device storing a corresponding program code in a predetermined element within the base station.

It should be noted that the block diagrams, example diagrams of a control/data signal transmission method, example diagrams of an operation procedure, and diagrams illustrated in FIGS. 1 to 4 have no intent to limit the scope of the disclosure. That is, it should not be construed that all element parts, entities, or operations shown in FIGS. 1 to 4 are essential elements for implementing the disclosure, and it should be understood that only a few elements may implement the disclosure within the scope without departing the subject matter of the disclosure.

The operations of the base station or the UE may be performed when a predetermined element within the base station or the UE apparatus includes a memory device storing the corresponding program code. That is, the controller of the base station or the UE apparatus may perform the operations by reading and executing the program code stored in the memory device through a processor or a Central Processing Unit (CPU).

Various elements and modules of the entity, the base station, or the UE used in the specification may operate by using a hardware circuit, for example, a combination of a complementary metal oxide semiconductor-based logical circuit, firmware, software and/or hardware, or a combination of firmware and/or software inserted into a machine-readable medium. For example, various electrical structures and methods may be performed using transistors, logic gates, and electrical circuits such as application specific integrated circuit.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method performed by a terminal in a wireless communication system, the method comprising:

receiving, by the terminal from a base station, configuration information;

identifying, by the terminal, whether the configuration information comprises at least one configuration associated with a slice based random access;

based on identifying that the configuration information comprises the at least one configuration associated with the slice based random access, identifying, by the terminal, whether a bandwidth part (BWP) selected for a random access procedure is configured with at least one of a 2 step random access type random access resource associated with the slice based random access or a 4 step random access type random access resource associated with the slice based random access;

based on identifying that the BWP selected for the random access procedure is configured with the 2 step random access type random access resource and the 4 step random access type random access resource, selecting, by the terminal, a random access type to a 2 step random access or a 4 step random access based on a reference signal reception power (RSRP) of a downlink pathloss reference; and transmitting, by the terminal to the base station, a random access preamble based on the selected random access type.

2. The method of claim 1, further comprising:

based on identifying that the BWP selected for the random access procedure is configured with only the 4 step random access type random access resource, selecting the random access type to the 4 step random access.

3. The method of claim 1, further comprising:

based on identifying that the BWP selected for the random access procedure is configured with only the 2 step random access type random access resource, selecting the random access type to the 2 step random access.

4. The method of claim 1, further comprising:

based on identifying that the BWP selected for the random access procedure is configured with the 2 step random access type random access resource and the 4 step random access type random access resource, identifying whether the RSRP of the downlink pathloss reference is above a preconfigured threshold;

based on identifying that the RSRP of the downlink pathloss reference is above the preconfigured threshold, selecting the random access type to the 2 step random access; and based on identifying that the RSRP of the downlink pathloss reference is not above the preconfigured threshold, selecting the random access type to the 4 step random access.

5. The method of claim 1, further comprising:

based on identifying that the configuration information does not comprise the at least one configuration associated with the slice based random access, selecting a random access resource not associated with the slice based random access.

6. The method of claim 5, wherein based on identifying that the BWP selected for the random access procedure is configured with only a 2 step random access type random access resource not associated with the slice based random access, the random access type is selected to the 2 step random access, wherein based on identifying that the BWP selected for the random access procedure is configured with only a 4 step random access type random access resource not associated with the slice based random access, the random access type is selected to the 4 step random access, and wherein based on identifying that the BWP selected for the random access procedure is configured with the 2 step random access type random access resource not associated with the slice based random access and the 4 step random access type random access resource not associated with the slice based random access, the random access type is selected to the 2 step random access or the 4 step random access based on the RSRP of the downlink pathloss reference.

7. The method of claim 1, wherein the at least one configuration associated with the slice based random access is configured for at least one slice group.

8. A terminal in a wireless communication system, the terminal comprising:

a transceiver; and a controller, communicatively coupled with the transceiver, configured to:

receive, from a base station, configuration information, identify whether the configuration information comprises at least one configuration associated with a slice based random access, based on identifying that the configuration information comprises the at least one configuration associated with the slice based random access, identify whether a bandwidth part (BWP) selected for a random access procedure is configured with at least one of a 2 step random access type random access resource associated with the slice based random access or a 4 step random access type random access resource associated with the slice based random access, based on identifying that the BWP selected for the random access procedure is configured with the 2 step random access type random access resource and the 4 step random access type random access resource, select a random access type to a 2 step random access or a 4 step random access based on a reference signal reception power (RSRP) of a downlink pathloss reference, and transmit, to the base station, a random access preamble based on the selected random access type.

9. The terminal of claim 8, wherein the controller is further configured to:

based on identifying that the BWP selected for the random access procedure is configured with only the 4 step random access type random access resource, select the random access type to the 4 step random access.

10. The terminal of claim 8, wherein the controller is further configured to:

based on identifying that the BWP selected for the random access procedure is configured with only the 2 step random access type random access resource, select the random access type to the 2 step random access.

11. The terminal of claim 8, wherein the controller is further configured to:

based on identifying that the BWP selected for the random access procedure is configured with the 2 step random access type random access resource and the 4 step random access type random access resource, identify whether the RSRP of the downlink pathloss reference is above a preconfigured threshold, based on identifying that the RSRP of the downlink pathloss reference is above the preconfigured threshold, select the random access type to the 2 step random access, and based on identifying that the RSRP of the downlink pathloss reference is not above the preconfigured threshold, select the random access type to the 4 step random access.

12. The terminal of claim 8, wherein the controller is further configured to:

based on identifying that the configuration information does not comprise the at least one configuration associated with the slice based random access, select a random access resource not associated with the slice based random access.

13. The terminal of claim 8, wherein based on identifying that the BWP selected for the random access procedure is configured with only a 2 step random access type random access resource not associated with the slice based random access, the random access type is selected to the 2 step random access, wherein based on identifying that the BWP selected for the random access procedure is configured with only a 4 step random access type random access resource not associated with the slice based random access, the random access type is selected to the 4 step random access, and wherein based on identifying that the BWP selected for the random access procedure is configured with the 2 step random access type random access resource not associated with the slice based random access and the 4 step random access type random access resource not associated with the slice based random access, the random access type is selected to the 2 step random access or the 4 step random access based on the RSRP of the downlink pathloss reference.

14. The terminal of claim 8, wherein the at least one configuration associated with the slice based random access is configured for at least one slice group.

* * * * *